(No Model.)
H. W. SISSON.
OVERCHECK BIT.
No. 469,190.  Patented Feb. 16, 1892.
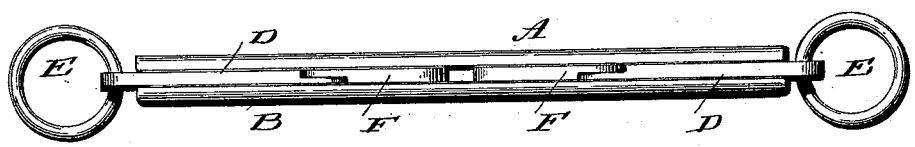
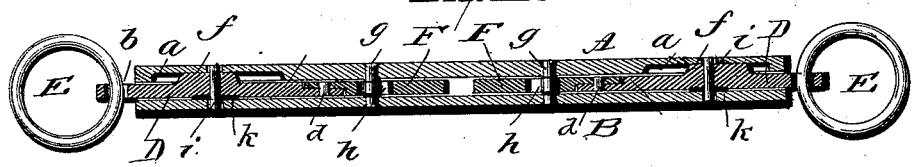
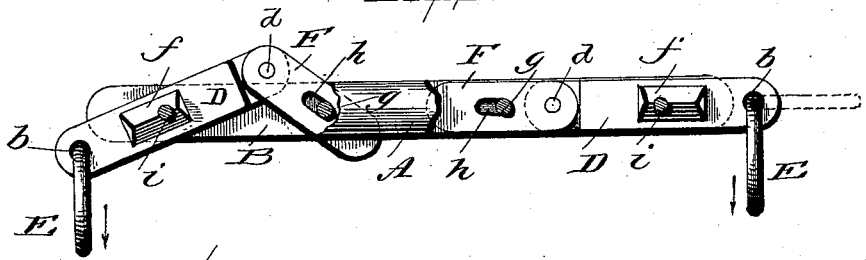
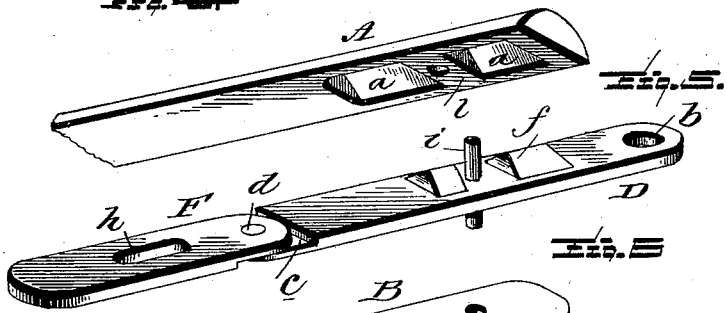
Witnesses
L. C. Hills
E. H. Bond
Inventor
Harry W. Sisson
per Chas. H. Fowler
Attorney

United States Patent Office.

HARRY W. SISSON, OF MONMOUTH, ILLINOIS.

OVERCHECK-BIT.

SPECIFICATION forming part of Letters Patent No. 469,190, dated February 16, 1892.

Application filed April 13, 1891. Renewed January 25, 1892. Serial No. 419,103. (No model.)

*To all whom it may concern:*

Be it known that I, HARRY W. SISSON, a citizen of the United States, residing at Monmouth, in the county of Warren and State of Illinois, have invented certain new and useful Improvements in Overcheck-Bits; and I do hereby declare that the following is a full, clear, and exact description of the same, reference being had to the annexed drawings, making a part of this specification, and to the letters of reference marked thereon.

The present invention has for its object to provide an overcheck-bit that will be simple in construction, effective in its purpose in preventing the animal from pulling or lugging on the bit, and effectually curing it of the habit, while the bit possesses both strength and durability and successfully operates for the purpose above named. These several objects I attain by the construction substantially as shown in the drawings and hereinafter described and claimed.

Figure 1 of the drawings represents an edge view of my improved bit; Fig. 2, a longitudinal vertical central section thereof; Fig. 3, a plan view, looking down on the bit, showing a portion of one of the side bars partly broken away; Fig. 4, a detail perspective view of a portion of one of the side bars on an enlarged scale. Fig. 5 is a similar view of one of the pivoted levers with slotted plate pivoted thereto; Fig. 6, a detail view in perspective of a portion of the side bar which is located opposite to that shown in Fig. 4.

In the accompanying drawings, A B represent the two bars forming the sides of the bit, and between which are pivoted the levers D, one near each end of the bit. The side bar A upon its inner face and near each end has substantially V-shaped mortises $a$ to receive a correspondingly-shaped lug, hereinafter described.

The levers D are of sufficient length to project beyond the end of the side bars A B, and these projecting ends have holes $b$ for attaching thereto suitable rings E for connecting the usual checkrein. The opposite or inner end of the levers D are halved out or rabbeted, as shown at $c$, and the inner ends of the plates F similarly constructed, so that a perfect lap between the two is secured, and connected together by a pivot $d$, thereby securing a perfect and easy-working joint. One side of the levers D have projections $f$, which engage the mortises $a$ in the side bar A, as previously stated, and are of substantially the same shape as said mortises, the levers being held between the side bars A B by the pivots $i$, and, if preferred, suitable washers $k$ may be interposed between the levers and one or both of the side bars, as found desirable.

The pivoted plates F, which are carried by the levers D, have elongated slots $h$ extending lengthwise of said plates, and through which pass the pins $g$, preferably enlarged at their center, said pins also passing through the side bars A B and serving as rivets to hold them together, as well as guides for the slotted plates, the shoulders formed by the central enlargement of the pins holding the side bars the requisite distance apart to enable the levers and the slotted plates pivoted thereto to freely work between the bars. The pivots $i$ are rigid on the levers D and move with them, the ends of the pivots loosely passing through the side bars A B, so that a perfect working of the levers is obtained, and consequently practical results secured when the bit is in use.

Of course it should be understood that the pivots $i$ may be made separate and afterward suitably attached to the levers D, or, if preferred, the levers may be cast with projecting pins on each side to serve the same purpose.

In Figs. 4 and 5 I have shown modifications of the mortises and projections, two mortises at each end of the lever being provided, which are divided by the transverse web $l$ to serve as means for receiving the end of the pivot $i$, the levers having a corresponding number of projections to engage with the mortises. By this means the side bar A is materially strengthened at its ends and a better bearing for the pivot is obtained. These mortises and projections serve to retain the levers and slotted plates between the side bars and bring them to their normal position after being thrown out, as shown in Fig. 3, the inclined bearing-surfaces of the mortises and projections serving in the capacity of cams to bring the parts on line with the side bars after being operated by the action of the animal's head.

In referring to Fig. 3 it should be understood that it is simply a plan view, looking down upon the bit, and not a side elevation, as it would appear when in the animal's mouth.

When the bit is in proper position in the animal's mouth and the bit pulled on by the raising of the animal's head, the check-rein will cause the levers D to move outward at an angle with the bit and carry with it the plate F, which latter is forced against the roof of the animal's mouth, so that its free end comes in contact therewith, thereby compelling the animal to release the bit and throw its head up, and, soon becoming used to the bit, will hold its head up at all times, and thus effectually cure the habit.

There are many details of construction herein described that may be variously modified and changed without departing from the principle of my invention, and I therefore reserve this right of making any such changes or variations in the operating parts of the bit as would be considered as coming within the scope of ordinary mechanical skill.

Having now fully described my invention, what I claim as new, and desire to secure by Letters Patent, is—

1. A bit consisting of side bars, plates pivoted to and between said bars on pivots rigid with the bars, and levers pivoted to the plates by loose connections and to the bars on pivots rigid with the levers and provided with projections, substantially as and for the purpose specified.

2. In a bit, the combination, with the side bars thereof, one of which has mortises near its ends, of pivoted levers carrying pivoted plates, said levers having correspondingly-formed projections to engage with the mortises, substantially as and for the purpose set forth.

3. In a bit, the combination, with the side bars, one of which has V-shaped mortises at or near its ends, of levers pivoted between said bars and having correspondingly-formed projections to engage with the mortises, slotted plates pivoted to the levers, and guide-pins extending through the side bars and through the slots in the plates, substantially as and for the purpose specified.

In testimony that I claim the above I have hereunto subscribed my name in the presence of two witnesses.

HARRY W. SISSON.

Witnesses:
JONAS W. PEARSON,
THOMAS D. GORDON.